April 12, 1966  E. R. SUMMERS  3,245,733
THRUST BEARING
Original Filed April 23, 1959  4 Sheets-Sheet 1

Inventor
Erwin R. Summers
by James R. Campbell
His Attorney

April 12, 1966 E. R. SUMMERS 3,245,733
THRUST BEARING

Original Filed April 23, 1959 4 Sheets-Sheet 2

Inventor
Erwin R. Summers
by James R. Campbell
His Attorney

April 12, 1966   E. R. SUMMERS   3,245,733
THRUST BEARING
Original Filed April 23, 1959   4 Sheets-Sheet 3

Inventor
Erwin R. Summers
by James R. Campbell
His Attorney

April 12, 1966  E. R. SUMMERS  3,245,733
THRUST BEARING
Original Filed April 23, 1959  4 Sheets-Sheet 4
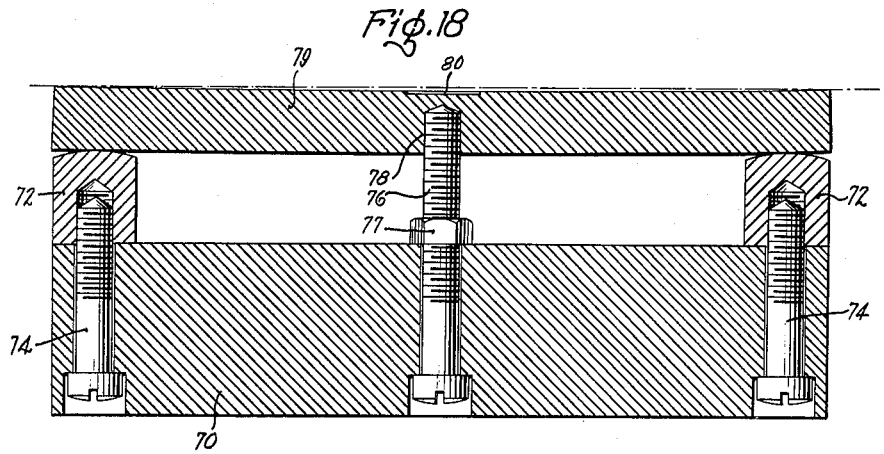
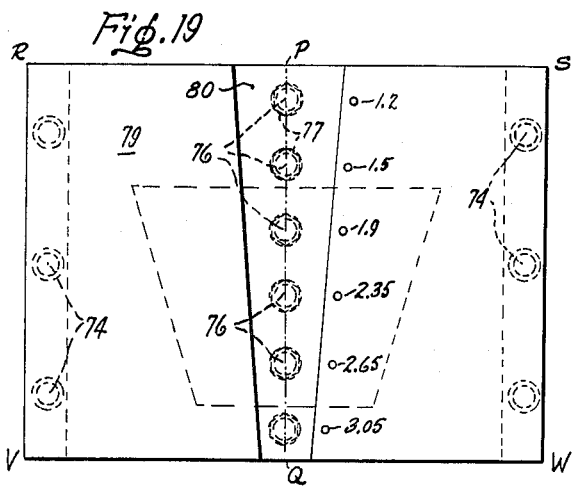
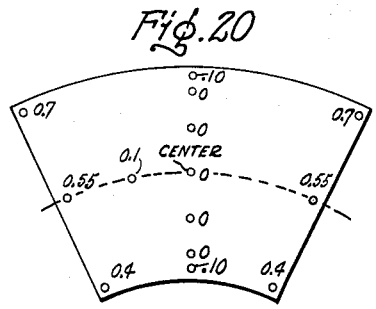
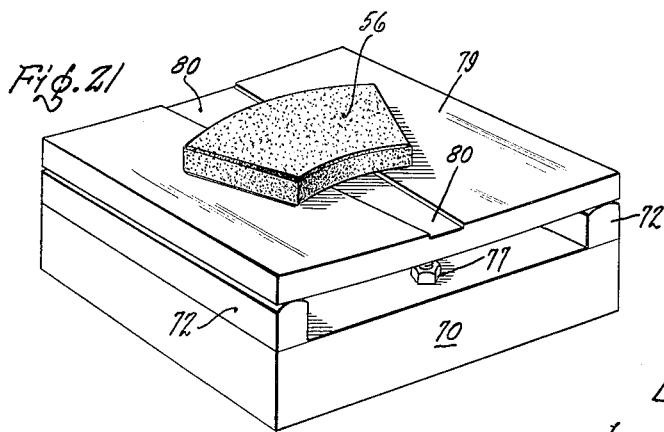
Inventor
Erwin R. Summers
by James R. Campbell
His Attorney United States Patent Office 3,245,733
Patented Apr. 12, 1966

3,245,733
THRUST BEARING
Erwin R. Summers, Scotia, N.Y., assignor to General
Electric Company, a corporation of New York
Continuation of abandoned application Ser. No. 808,419,
Apr. 23, 1959. This application Nov. 14, 1962, Ser.
No. 239,394
1 Claim. (Cl. 308—160)

This application is a continuation of application Serial Number 808,419, filed April 23, 1959, for Thrust Bearing, now abandoned.

The invention described herein relates to bearings and more particularly to water lubricated thrust bearings adapted for use with equipment exerting large thrust forces during starting and subsequent operation.

Many different types and variations of thrust bearings have been designed and used for accommodating thrust pressures of large magnitude, i.e. 400 p.s.i. or greater, but these bearings are usually limited to shoes having metal contact surfaces, such as babbitt, and utilize oil or other relatively high viscous liquids for lubricating purposes. Because of the impracticality of using oil to lubricate bearings in a pressurized water environment, and the incompatibility of most of the metallic bearing materials when mated with metallic shafts or runners in such a water environment, past developmental efforts have produced carbon or graphitic bearing pads especially adapted to use water as a lubricating medium. In some cases, the materials have been reversed by using a carbon runner with metallic shoes. These carbon bearings have been used with success but only in those instances where the thrust forces have not exceeded predetermined low values. Present demands being placed on equipment utilizing carbon bearings sometimes require the bearings to handle thrust forces in excess of that which can be handled safely by contemporary designs.

The invention described herein is an improvement in the design and construction of presently available carbon thrust bearing pads wherein forces several times greater than that heretofore considered possible can now be handled without damaging either the bearing pad surface or its associated runner.

FIGURES 1-6 illustrate prior art bearing constructions and include reproduction of carbon pad and runner surfaces after being subjected to average thrust forces in a 1250 H.P. motor. FIGURE 1 depicts a conventional bearing pad before being placed in use.

It will be understood that a conventional water lubricated thrust bearing consists of a shaft mounted circular plate or runner having carbon pads in contact therewith for transmitting to the frame of a motor for example, thrust forces exerted by the rotating member. FIGURE 7 shows such a construction. In various sizes of motors, such as 25 to 1200 H.P., 6 or more of these bearing pads are positioned circumferentially around and in contact with the runner surface, and each pad is fitted in a shoe supported by an arrangement of equalizing rockers for assuring symmetrical loading and balance during operation.

Each carbon pad 20 has a design of the type illustrated in FIGURE 1 and comprises a block of carbon or graphite material of general segmental design having two opposite edges shaped to an arc of a circle. The bottom of the pad is flat while the upper surface 22 is crowned with a spherical or parabolical surface of revolution between .0002 and .001 inch in height depending on the size of the pads.

With pads of this configuration placed on the runner of a thrust bearing in a motor, at the initial movement of the runner at starting, and before a hydrodynamic film is established by rotation, the entire load on a pad is concentrated on a small unlubricated circular area of initial diameter $d_1$ which may cover less than 10 percent of the total surface of each pad. As the rotor accelerates and is lifted slightly by the fluid film established by rotation, the effectively loaded area increases from $d_1$ to some larger circle of diameter $d_2$; but the film pressure remains a maximum at the apex, becomes progressively less at increasing distance from center, and relatively negligible as some diameter $d_2$ is exceeded, with an unfavorably small part of the pad surface carrying most of the load.

When the load concentration becomes high enough to break down the fluid film at the top of the crown, material wears off the apex, diameters $d_1$ and $d_2$ increase, and the load is distributed over a larger area. The increased surface area thus made available as a result of wear allows the bearing in some cases to operate without failing but often produces a rough surface of the type shown in FIGURE 2. This method of redistributing load however, is considered undesirable because the hard abrasive particles of carbon enter the lubricating system and give rise to two major factors contributing to bearing destruction; namely, generation of excessive heat which chars the pads and creates radially extending cracks in the pads and in the central portion of the runner track, as illustrated in FIGURES 3 and 4, and destructive grooving of the pads and runners, as shown in FIGURES 5 and 6.

Reference to FIGURES 3 and 4 shows the effects of bearing wear resulting from operating a carbon pad and thrust runner in a machine. The combined effects of load concentration on too small a portion of the parabolically shaped contact surface on the pad prevents the water lubricant from flowing over all portions of the pad surface and establishing and maintaining a continuous fluid film. Instead, most of the water passes around the contact area and over those surfaces of the pad not being utilized for load carrying purposes. Lack of lubrication with consequent breakdown of fluid film in local areas between the surfaces causes physical contact between the parts and greatly increases the coefficient of friction. The runner and pads become hot in local areas and distort from thermal expansion, with ultimate wear occurring between the pads and runner at the points of contact in the bearing structure. Melting of the metallic surfaces occurs in extreme cases. FIGURE 3 shows radially extending cracks 26 formed in the runner surface by the expanding and contracting of the metal which has been extended beyond its elastic limit. Similar cracks also occur in the graphite pads. The sharp edges thus provided, shave minor particles off the pad and runner surfaces which not only disfigure and groove the pad and runner surfaces, but introduce abrasives in the lubricating system. FIGURE 4 illustrates the condition of a carbon pad used with the runner FIGURE 3 which clearly shows that the apex of the parabolical surface has been reduced to a substantially flat surface having grooves and other distortions as a result of the wearing process.

Figures 5 and 6 illustrate the condition of a pad and runner resulting from the introduction of particles into the lubricating system. The particles wedge themselves between the pad and runner surfaces and ultimately hang up in the indentations or grooves respectively formed in both the runner and bearing pad surfaces. The metallic particles seem to adhere to one another and build up above the surface of the pad and runner and because of their abrasive characteristics, act as a grooving tool, much like a lathe, to cut grooves and channels 27 in the pad and the runner surfaces. Continued operation under these conditions causes the accumulated particles to grow n size thus increasing the tooling effect which then gouges chunks out of the pad and runner surface as indicated at 28.

The pads and runners shown in these figures were operated in a double thrust bearing for 24 hours at 900 r.p.m. and 8 hours at 1800 r.p.m. in a motor rated 4/8 poles, 1250/160 H.P., 1800/900 r.p.m., 3 phase, 2300 volts, and assembled with .080 inch end play. The grooves in the runner shown in FIGURE 3 extended up to 1/16 inch deep by 1/4 inch wide.

The above general description of failures that sometimes occurred with the prior art is directed toward the major aspects only of undue bearing wear and it will be evident that other factors contribute materially to the wear problem.

Operation of machines having such bearings indicate that bearings of the prior art can handle greater total loads if the number of bearing pads is increased to more than six, but design and manufacturing considerations generally do not permit adding a large number of additional pads to the structure.

A primary object of my invention therefore is to provide a bearing pad construction capable of distributing thrust loads over a larger area than that known in the prior art so that the loading per square inch will be low enough to permit maintenance of a lubrication film between carbon bearing pads and runner surfaces.

Another object of my invention is to provide a bearing pad construction wherein lubricant is permitted to approach the crowned area and thereafter flow over it in a uniform manner without disturbing the lubricant flow pattern.

Still another object of my invention is to provide a bearing pad construction initially having sufficiently large load area so that resort to a wearing process for providing an adequate loaded area will not be necessary.

In carrying out my invention I provide a carbon or graphitic thrust bearing pad having a bearing surface of flat, cylindrical, conical or other configuration extending substantially the complete radial depth of the pad for permitting a wide distribution of load on the bearing surface and for facilitating more uniform flow of lubricant between the bearing pad and thrust runner during starting and subsequent operation. The radially extending leading and trailing edges of each bearing pad are equipped with transverse tapered or curved lands for allowing gradual entry of lubricant and a progressive increase in fluid pressure as it approaches the top of the crown for either direction of rotation. The inner and outer arcs of each pad also are designed to locate the center of gravity of the pad with respect to the pivot underneath each carbon pad thereby to provide balance and symmetry of fluid film in the bearing system. An improved lapping plate is specifically designed to provide any bearing surface curvature which will permit proper distribution of load and flow of lubricant into the bearing structure.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawings wherein:

FIGURE 18 is a view in elevation, partly in section, of a lapping plate shown in a deflected condition and used for forming the rounded contour on a carbon bearing pad;

FIGURE 19 is a plan view of the lapping plate shown in FIGURE 18 illustrating the degree of deflection in terms of elevation;

FIGURE 20 is a plan view of a conical crowned carbon pad showing relative elevation in mils with respect to the center of the pad on a radial center line; and FIGURE 21 is a perspective view of the lapping plate shown in FIGURE 18.

Figure 1:
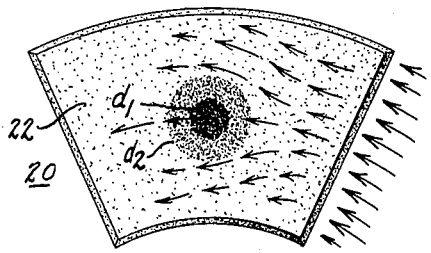
FIGURES 1–6 illustrate a carbon pad designed of the prior art in addition to reproductions of carbon pads and their associated runners which have been operated to failure.
Figure 2:
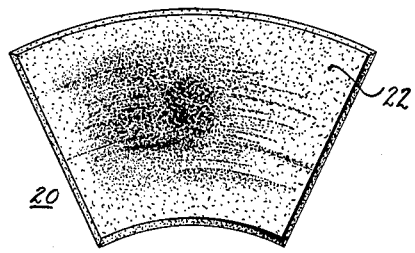
Figure 3:
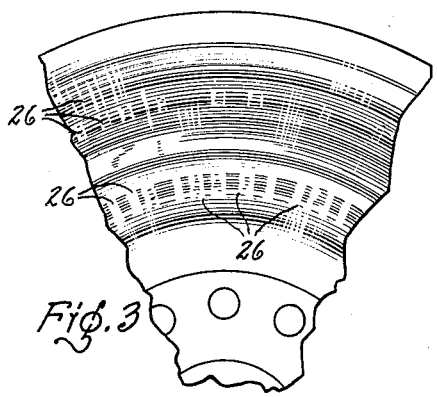
Figure 4:
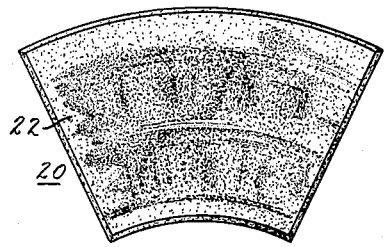
Figure 5:
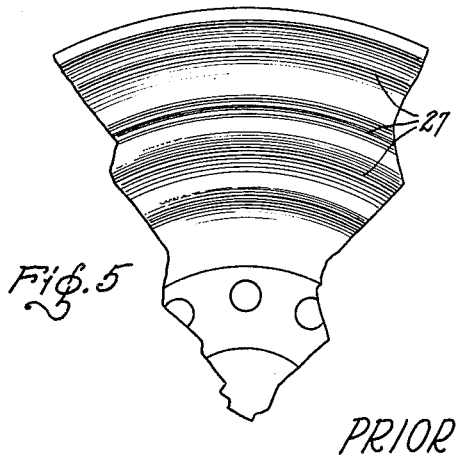
Figure 6:
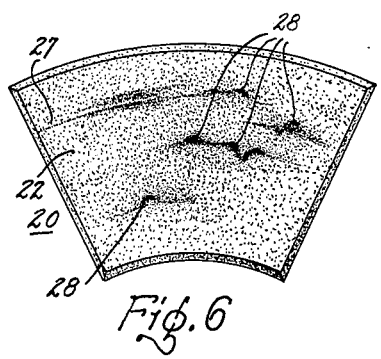
Figure 7:
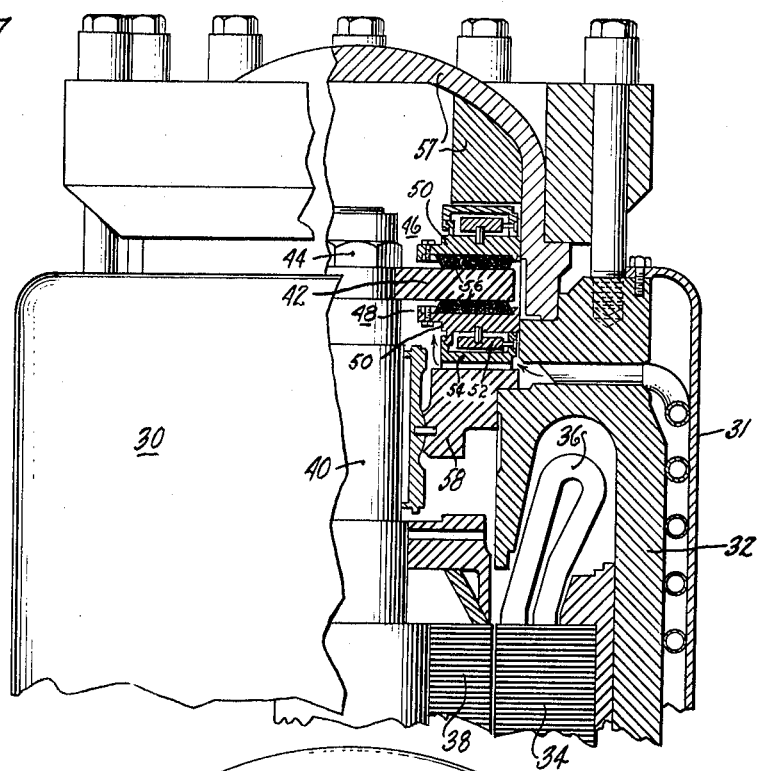
FIGURE 7 is a view of elevation, partly in section, of the upper end of a motor showing the disposition of the various parts comprising a thrust bearing.
Figure 8:
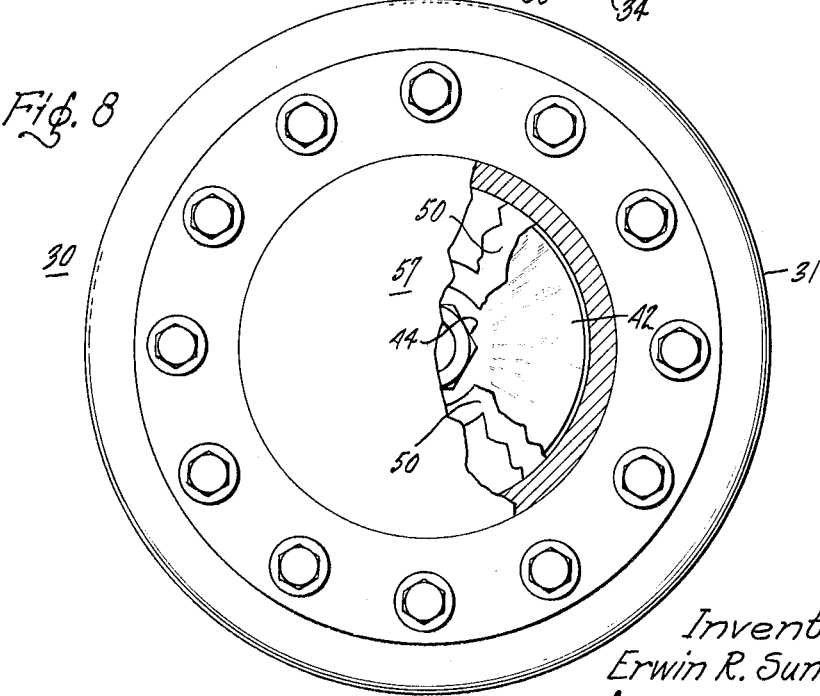
FIGURE 8 is a plan view of FIGURE 7 with parts cut away to show the runner surface.

Referring now to the drawings wherein like reference characters designate like or corresponding parts through the several views, there is shown in FIGURE 7, a squirrel cage induction motor 30 including a thrust bearing in the upper end thereof. The motor includes a shell 31 enclosing a frame 32 utilized for holding a stator core 34 and coil conductors having end turns 36 in a fixed position. A rotor 38 is centrally positioned within the stator for electrodynamic cooperation therewith and includes a shaft 40 having a thrust bearing runner 42 affixed to the upper end thereof by means of a bolt 44 or similar securing means. Equalizing type thrust bearing arrangements 46 and 48 of a kind well known in the art are positioned on opposite sides of the runner and serve to transmit the forces generated by the rotor during operation to the machine frame. Generally, the bearings consist of a plurality of spaced shoes 50 circumferentially disposed around the shaft 40 and pivoted on spherical seats 52, the loads on the seats being equalized by an interconnected rocker and linkage mechanism 54 of a type well known in the art. The carbon pads 56 are secured in the shoes in a well known manner and have their bearing surfaces resting in contact with the corresponding surfaces of the thrust runner 42. Thrust forces are carried by the heavy structural parts 57 and 58.

Although the various improved carbon pads described hereinafter have surface configuration different from each other, they all have common design features of distributing the load approximately equally over the entire radial depth of the pads and of providing near the leading and trailing edges, a surface profile which serves the basic and important function of providing a progressive increase in fluid pressure as the water lubricant approaches the zone of minimum clearance at the top of the pad surface crown. In all cases, water entry across the leading or trailing edges is substantially at right angles to the pad and after entry into the pressure area between the pad and runner surfaces, continues to flow uniformly there-across with only a small portion being deflected to one side or the other, i.e., radially inward or outward.

Figure 9:
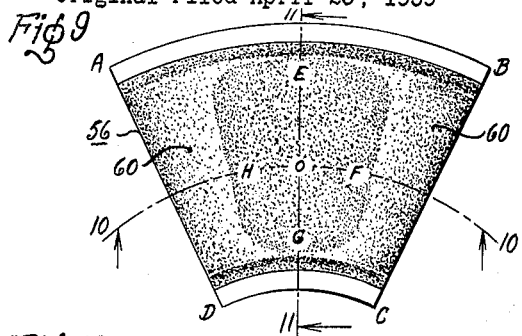
FIGURE 9 is a plan view of a carbon pad having a conical or cylindrical surface including a flat area formed thereon for providing for a wide distribution of load when the bearing pad is initially placed in operation.
Figure 11:
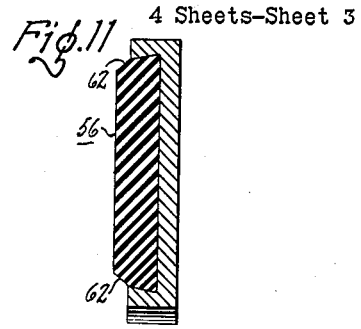
FIGURE 11 is a view taken on lines 11—11 of FIGURE 9.
Figure 10:
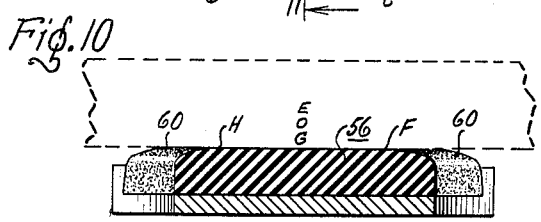
FIGURE 10 is a view taken on lines 10—10 of FIGURE 9.

FIGURES 9, 10 and 11 illustrate a carbon pad 56 of the dimensions shown having a conical or cylindrical crown 60 of approximately .0005–.0006 inch bounded by sides ABCD. A tapered relief 62 of about .0001 to .00015 inch extends approximately ¼ inch from the inner and outer arcs toward the pad center for minimizing concentration of load at the edges. A flat surface EFGH of trapezoidal configuration comprises the initial bearing contact surface before the runner starts and its relatively large size permits increasing the capacity of thrust bearings by distributing load initially over a large elongated area and yet retaining a crowned contour at the leading and trailing portions of the pads. Although precise size and crown dimensions have been given, it will be understood that they apply to a specific embodiment only and that other appropriate dimensions obviously must be used according to the size of bearing pad and height of crown desired or needed in any particular installation.

With the above bearing pads installed in a thrust bearing on a machine, at the initial movement of the runner 42 and before a load film has been established between the pad and runner surfaces, the bearing pad will tilt slightly and squeeze water between the crowned pad and the runner to immediately reduce the friction at starting and to commence establishing the load film. The crowned portion 60 is specifically designed to have the same elevation along its radial depth, from inside to outside radius, but increasing in elevation circumferentially toward the flat surface so that as the water lubricant flows into this area, there is a progressive and symmetrical increase in fluid pressure such that the runner is lifted an incremental amount off the surface of all the lower bearing pads 56. Continued movement of the runner causes further pressurization of the fluid film until it reaches the zone of minimum clearance where film pressure is at a maximum. The lubricant film is therefore firmly established and the pressures therein exactly balance that of the downward thrust forces. Water flow thereafter follows substantially parallel circumferential lines across the bearing surface with only a very small portion being deflected radially of the pad. As the motor comes up to its operating speed, the rotating runner drags an increasing amount of water lubricant between its surface and the upper bearing pads to establish and maintain a thicker film between these parts which will transmit increasing axial thrust forces to the motor supports 57.

Figure 12:
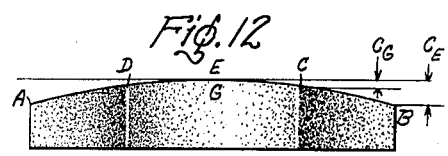
FIGURE 12 is an end view of elevation of a bearing pad having a cylindrical crown not including any flat areas of the type illustrated in FIGURE 9.
Figure 13:
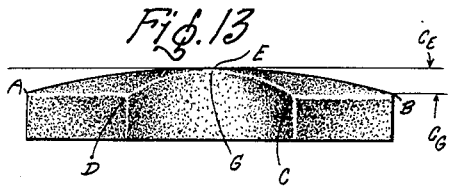
FIGURE 13 is an end view in elevation of a carbon bearing pad having a conical crown not including any flat surfaces of the type shown in FIGURE 9.

Although the above description has been direct to conical or cylindrical crowns having flat zones at the apex, tests have shown that the flat zone EFGH need not be provided in all cases. The crown may retain its cylindrical or conical shape as indicated in FIGURES 12 and 13, which are end views in elevation of the pads, or FIGURE 14 which shows a crown having a continuous curve surface. With either the cylindrical or conical crown, the points EO and G are at the same elevation at the top of the crown, and load is applied over almost the entire radial depth from inside to outside diameter of the pads and the runner, instead of being highly concentrated on a point at the middle of the runner track as in pads of the prior art. This is analogous to changing from a ball bearing to a roller bearing to obtain a greater surface area for distribution of load.

If the bearing pads were approximately rectangular, or if the inches length of inner arc DC were over 75 percent of that of the outer arc AB of the pad, then a simple cylindrical crown would be acceptable because the difference in height of crown $C_G$ and $C_E$, at locations G and E respectively, would not be excessive. However, when DC is less than half of AB, then $C_G$ is only about one-quarter of $C_E$ with a cylindrical surface, and this construction therefore should be avoided.

Figure 14:
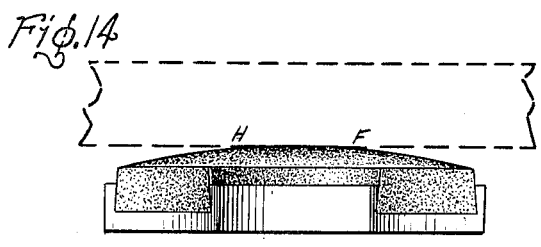
FIGURE 14 is a view in elevation, partly in section, of a cylindrical crowned bearing pad taken on a line through the central portion thereof.

Equal heights of crowns, $C_E = C_G$, or any desired ratio between them, can be obtained at E and G by lapping a conical surface on the pads such that the radius of crown curvature at G is smaller than at E (radius $R_C$ less than $R_E$). A true conical surface similar to a frustum of a cone with continuous curvature in circumferential direction can be used as shown in FIGURE 14, or the area inside the boundary EFGH can be lapped flat as in FIGURE 10. Both of these patterns, and also intermediate contours, have been tested successfully.

A higher crown is permissible on a cylindrical or conical contour with a larger elongated contact area, than on a spherical or paraboloidal surface with a smaller circular contact at the center; hence a given manufacturing error is a smaller percentage of the conical or cylindrical crown and is less likely to cause trouble.

A particular advantage derived from using this construction is that there is usually no drastic harm if .0002 inch mechanical distortion causes a conical crown to decrease from .0006 to .0004 inch, because sufficient clearance remains to facilitate the entry of water because the leading edge of the pad and the runner to maintain fluid film pressure in the bearing. However, with a flat pad, or one that has a flat zone extending too near the edges, a small change in contour can concentrate enough load at the edges or corners of the pad to cause local breakdowns of fluid film and also to harmfully restrict the entry of water into the bearing. The conical or cylindrical crown is less vulnerable to dimensional errors and changes than pads of other designs.

Figure 15:
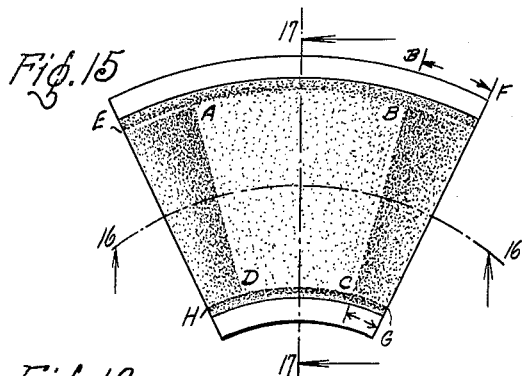
FIGURE 15 is a plan view of a carbon bearing pad having a flat surface over its complete area except for tapered lands formed on the leading and trailing edges thereof.
Figure 17:
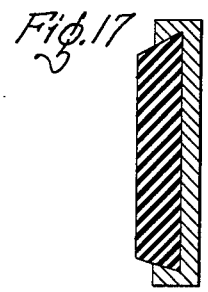
FIGURE 17 is a view taken on lines 17—17 of FIGURE 15.
Figure 16:
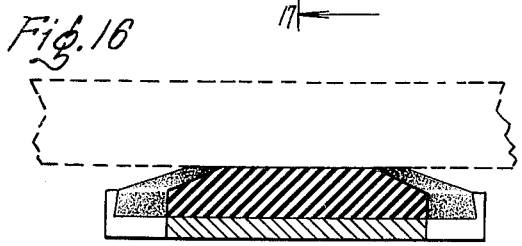
FIGURE 16 is a view taken on lines 16—16 of FIGURE 15.

It has been found that a combination of flat zones with tapered lands on a crown can be used successfully in bearings subjected to high thrust loads. In this desgin, the bearing pad is lapped perfectly flat along the radial depth and length of arc except for the lands which are tapered symmetrically on the leading and trailing edges. FIGURES 15, 16 and 17 illustrate such as arrangement wherein the flat area ABCD includes about 80% of the pad surface. Angle delta, which is the same at CG as at BF provides about .001 to .002 inch taper on the opposite lands and extends in approximately ¼ inch from the ends along the inner arc and ⅝ inch along the outer arc.

In like manner a flat zone can be machined on spherical or parabolical crowns to distribute the load over a larger percentage of the bearing pad. Increase in the effective bearing area from approximately 5% of the prior art pads to between 15% and 40% has been accomplished in bearings that have operated satisfactorily. As indicated above however, the parabolical crown is less desirable because the water flow does not cross the pad surface uniformly, especially when the concentration of load approaches maximum values.

The above description has been directed primarily toward curved crowns of different contours, i.e., cylindrical, conical, etc., but it is apparent that other configurations including a circle ellipse or parabola in one axis, as contrasted with a sphere or paraboloid of revolution, are well within the scope of this invention. As previously mentioned, it is highly desirable to have a curved or tapered land at the leading and/or trailing edges to permit water lubricant to be squeezed in the tapered clearance between the pad and runner surfaces both during and after starting. Regardless of whether a flat zone is provided at the central part of the pad surface, the tapered land at the leading edge may range in design from a uniform taper to any other contour capable of providing a gradual or progressive increase in fluid pressure to the water lubricant as it enters the bearing and approaches the zone of maximum pressure. Stated differently, the angle formed by the runner surface and the taper on the pad land need not be constant. It may vary, as when the land is curved conically, so long as the land design is capable of imparting graduated pressure to the lubricant during and after starting. As used in the claims, the term graduated means a tapered land design of the type described above.

Obviously, either or both of leading and trailing ends may be tapered or contoured depending on whether the machine is designed for rotation in a single or both directions.

Where a bearing must operate in both directions of rotation, the taper patterns on the leading and trailing portions of the pad are usually symmetrical. For single direction of rotation, less taper may be used on the trailing edge.

A flat load-distribution surface may selectively be used at the apex of the crown, depending on the loads required to be handled by the bearing pads. In those installations where light loads are imposed on the bearing, a surface of curvilinear design may be employed where the zone of minimum clearance may be very small. Although the carbon bearings have been disclosed for use with water lubricants, other liquid mediums, obviously may be used. Likewise, the invention is applicable to bearing materials other than those comprising carbon.

In order to provide cylindrical, conical or other curved crowns on the bearing pads, an adjustable hand-lapping plate of the type shown in FIGURE 18 may be employed to obtain the desired surface curvature. The lapping plate comprises a base 70 having oppositely disposed supports 72 extending along the base length which are held in position by bolts 74 of a length less than the holes in the base and threaded end supports. A plurality of equally spaced cap screws 76 having bolts 77 are located along the center line of the base with their ends being threaded into mating threaded holes 78 in the underside of the flexible plate 79 shown as being partly deflected. It will be evident that when the cap screws 76 are tightened, they deflect the lapping inwardly a corresponding amount as shown in FIGURE 18. To obtain a cylindrical surface on a bearing pad adapted to be lapped on the plate, the cap screws are tightened equally or until the top surface of the plate has an equal dip $h$ at the opposite ends P and Q and at all intermediate points on the center line P–Q.

To obtain the conical surface on a pad, such as that shown in the dotted line in FIGURE 19, the cap screws nearest to Q are tightened most and those nearest to P are tightened the least with graduated steps on the intermediate cap screws so as to obtain a progressively increasing radius of curvature in the cast iron plate in passing from Q to P. By using a suitable lapping compound and patterns of motion, the face of the bearing pad can be quickly lapped to match the contour of the cast iron plate. After lapping, the surface of the bearing pad will be a substantial image of the lapping plate since variations in the elevation of various points on the plate will be reflected in the dimensions of the crown on the bearing pad. Since a number of cap screws are disposed along the length of the lapping plate, the plate can be deflected in incremental amounts according to the design of the crown desired on a particular carbon pad. In order to know the degree of deflection in the plate, changes in its surface from a horizontal plane are considered in terms of elevation which in turn can be converted into the curvature of crown to be provided on any carbon pad. Obviously, with minor modifications, the lapping plate 79 can be deflected outwardly for obtaining a concave surface on a bearing pad, such as is used in guide bearings, and the only change necessary to be made in the structure is that of providing means for holding the plate in firm but sliding contact with the support 72.

The numbers along the center line of FIGURE 19 ranging from −1.2 to −3.05 represents a specific adjustment for lapping the pads for 13½ inch diameter bearing and show the distance $h$ in mils by which the corresponding location on the upper surface of the lapping plate have been pulled down below the horizontal corners SW and RV by tightening each bolt a different amount.

It will be apparent that lapping of the pads will produce a deposit or residue which must be collected during the lapping operation and this is accomplished by providing a .012 inch recess 80 extending the lapping plate length and varying from ¾ to 1¾ inches in width, as shown in FIGURES 18 and 19. This recess serves to collect the residue of lapping compound and pad material that tends to move toward the lowest part of the curved surface. If the abrasive residue is allowed to accumulate between the carbon pad and the active surface of the cast iron, the contour obtained on the face of the pad can be widely different from that of the lapping plate.

Extended tests of conically crowned bearings have been made and all of these have proven successful. The trials include several running and stopping tests made on 13½ inch diameter conical bearings at a thrust load of 35,000 pounds which corresponds to 500 p.s.i. of pad surface, and is more than 15 times the anticipated motor application load for which these thrust bearings initially were selected. Prior art bearings of the type disclosed in the introductory portions of the specification failed completely after approximately 40–50 hours of operation and under thrust loads of only a few thousand pounds.

The primary advantages derived from utilizing these improved crowned carbon pads over the spherical or parabolical pads of prior art are that the new pads are capable of distributing the load concentration or pressures more uniformly over a larger percentage of the bearing surface to thereby increase the load capacity. The new pads permit the use of a higher crown so that the bearing performance will be less vulnerable to small variations in manufacture or to subsequent dimensional distortion or deflection of component parts as the temperature and load change. The new pads increase flexibility in the bearing design so that wider departure can be made if desired, from the conventional one to one ratio between length of arc and radial depth of bearing pad as taught by the prior art. Full use of the radial depth of the runner is now made to carry heavier loads and the surfaces of conical, cylindrical, and other configurations, and all intermediate shapes therebetween, are adaptable to a wider range of ratios of inside or outside diameter. The design of the crown, particularly adjacent the leading and trailing edges, allows symmetry of water lubricant approach to the loaded area for either direction of rotation so that entry to all points along the radial depth of the pad is made possible without circumventing any portion of the pad which may be placed under load. Also, after the water enters the bearing pad-runner zone of minimum clearance, it tends to flow in a uniform pattern along the arc length of the pad prior to exit on the opposite side thereof. Additional and important advantages are that the increase in load carrying capacity of the pads permits a substantial reduction in the diameter of the runner. This constitutes a real improvement in thrust bearing construction since lower starting torques are now made possible thus eliminating in many cases, the prior need to lift the runner by lubricant pressure before energizing the motor. Higher motor efficiencies result in addition to reduction in heat loss occasioned by agitation of the lubricant. The smaller diameter thrust bearing made possible also results in less deflection in the runner and in the equalizing rockers and linkages and allows a more even distribution of load in the thrust bearing and minimizes the variation in the pattern of distribution as the load changes. The bearings are not as vulnerable or susceptible to vibration because of the provision of a greater contact area. Because the bearings can now handle several times the load attainable in the prior art, a lesser number of bearing pads can be employed to perform the same function as a greater number in the past. The use of a lesser number of pads decreases the expense of a complete thrust bearing because of the lesser number of pads, shoes, pivoted equalizers, pins, and the like which are required.

Although a specific embodiment has been disclosed to illustrate the invention, it will be evident that the teachings apply to other kinds of bearings and that many modifications and variations fall within the scope of this invention. It therefore is to be understood that within the scope of the appended claim, the invention may be practiced otherwise than as specifically described.

What I claim as new and desire to secure by Letters Patent of the United States is:

A carbon bearing pad comprising a block of carbon having a bottom surface adapted for positioning in a thrust bearing shoe, a curved crown on the upper surface thereof extending in a circumferential direction and changing in elevation from the leading to the trailing edge and over a major portion of the pad radial depth for progressively increasing the pressure in a lubricating medium as it flows toward the zone of minimum clearance between the crown and a runner adapted for association therewith.

References Cited by the Examiner

UNITED STATES PATENTS

| 1,730,503 | 10/1929 | Hanzlik | 308—160 |
| 2,338,858 | 1/1944 | Lignian | 29—149.5 |
| 2,363,430 | 11/1944 | Meldahl | 308—160 |
| 2,403,805 | 7/1946 | Kulla | 51—212 |
| 2,404,808 | 7/1946 | Lowey | 29—149.5 |
| 2,569,099 | 9/1951 | Herzstark | 51—212 |
| 2,874,007 | 2/1959 | Cametti | 308—160 |

FOREIGN PATENTS 420,847  11/1925  Germany.

DAVID J. WILLIAMOWSKY, *Primary Examiner.*

FRANK SUSKO, ROBERT C. RIORDON, *Examiners.*